Jan. 11, 1944.   A. WOLFRAM ET AL   2,339,126
PROCESS OF FORMING ESTERS
Filed April 19, 1941
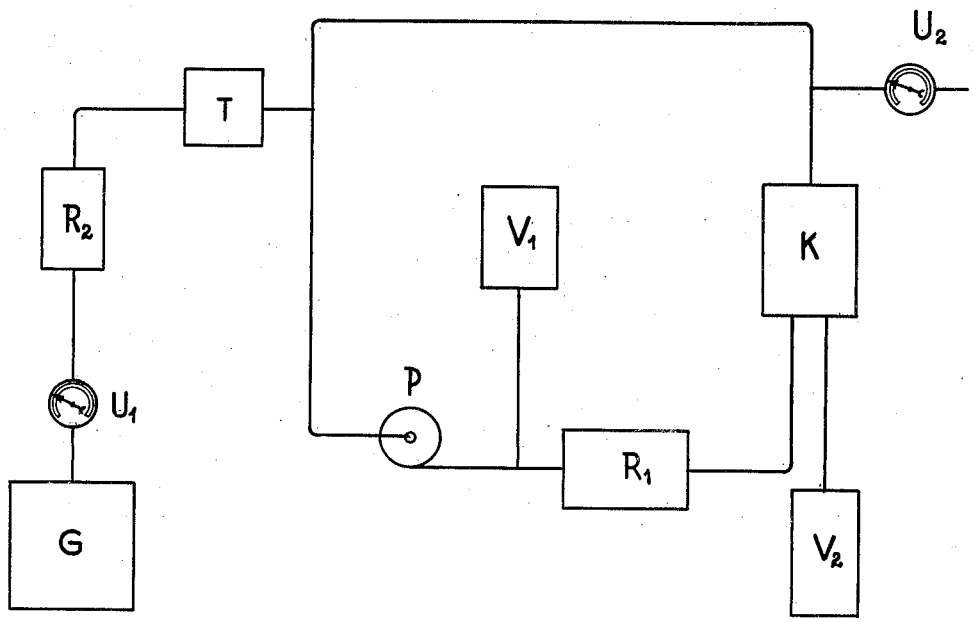
Arthur Wolfram
Hellmuth Jahn
INVENTORS
BY
THEIR ATTORNEYS

UNITED STATES PATENT OFFICE 2,339,126

PROCESS OF FORMING ESTERS

Arthur Wolfram, Frankfort-on-the-Main, and Hellmuth Jahn, Bad Soden in Taunus, Germany; vested in the Alien Property Custodian Application April 19, 1941, Serial No. 389,340
In Germany February 8, 1940

7 Claims. (Cl. 260—488)

The present invention relates to a process of forming esters.

The addition of carboxylic acids R.COOH to vinylacetylene in the liquid phase according to the equation:

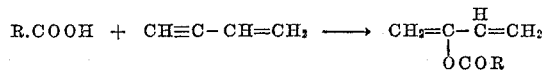

with formation of the esters of 1.3-butadienol-2 is known. (U. S. A. Patent No. 1,963,108.) Hitherto, however, only small yields have been obtained. Substantial portions of the esters resinify and compounds comprising the addition product of 1 mol of monovinylacetylene and 2 mols of carboxylic acid are formed.

In the known processes there are used as catalysts for the reaction mercuric oxide or mercury salts, for instance, the sulfate or phosphate in combination with boron fluoride, sulfuric acid, $SO_3$ or sulfoacetic acid. The temperatures applied range from 0° C. to +25° C. but in some cases may be even up to +60° C.

Now, we have found that the mercury salt of the carboxylic acid which serves for carrying out the reaction is a very suitable catalyst without any adjuvant. For the addition of acetic acid mercury acetate is used, in the case of propionic acid mercury propionate is used and so forth. It is detrimental to add boron fluoride, sulfuric acid, $SO_3$ or the like in the quantities hitherto used since the ester formed is changed by these compounds.

The new catalysts become active only at temperatures above about 60° C., preferably at temperatures near 70° C.–90° C. These high temperatures involve the danger of polymerization of the esters by heat. It has, however, been found that by addition of the usual stabilizing agents which prevent the polymerization such as thiodiphenylamine, methylene blue, dibenzyl-$\beta$-naphthylamine or the like the polymerization is prevented. The higher reaction temperature involves two important advantages for the preparation of the volatile esters: firstly, it is possible to perform the addition reaction continuously. This was not the case with the process hitherto known according to which the catalyst had to be destroyed before the ester obtained could be isolated. If higher temperatures are applied, however, the process may be conducted so that the current of gas of the unreacted monovinylacetylene carries a mixture of carboxylic acid and ester away from the reaction zone. The mixture obtained which is entirely free from mercury salt consists, in case propionic acid is used at a reaction temperature of 80° C., of 70–75 parts of propionic acid and 30–25 parts of ester. The mixture is removed, separated acording to known methods, for instance, by distillation or extraction of one of the two components by means of a solvent, and the propionic acid is reconducted into the reaction zone. This method of working involves a second advantage, namely the avoidance of the formation of a by-product. In view of the fact that the ester formed is directly removed from the reaction zone, a product is no longer formed from 2 mols of carboxylic acid and 1 mol of monovinylacetylene.

It has, furthermore, been found that the degree of purity of the monovinylacetylene is of great importance. It is advantageous to carefully exclude the atmospheric oxygen, since it causes the catalyst to become quickly inactive. It is also advisable to exclude water.

The following acids are, for instance, suitable for preparing esters: acetic acid, propionic acid, butyric acid, isobutyric acid, n-heptylic acid, isoheptylic acid; furthermore, aromatic carboxylic acids such as benzoic acid and the homologues thereof and isocyclic carboxylic acids such as naphthenic acids. In case the melting point of an acid is too high, solvents which are indifferent to vinylacetylene may be used, for instance, ethers, such as dibutylether, diisoamylether and the like.

The following examples serve to illustrate the invention but they are not intended to limit it thereto. The parts given are by weight:

(1) The apparatus as shown in the accompanying drawing is filled with nitrogen free from oxygen. Thereupon, 1000 parts of propionic acid, 350 parts of mercury propionate and 4 parts of thiodiphenylamine are heated to 80° in the reaction vessel $R_1$. The monovinylacetylene passes from the tank G through the gas meter $U_1$, through the gas purifier $R_2$ in which the gas is freed from the oxygen and through the drying device T into pump P which presses the gas into the reaction vessel $R_1$. During the passage of the monovinylacetylene the color of the mixture changes from green to violet. The current of gas carries a mixture of 70–75 parts of propionic acid and 30–25 parts of 1.3-butadienol-2-propionate into the cooler K in which the mixture is condensed and collects in the receiver $V_2$. From there the mixture of the liquids is distilled and the ester is freed from the propionic acid according to known methods. From the cooler K the gas current returns through the pump into the reaction vessel. Provision has been made to measure and draw off flue gas through the gas meter $U_2$. From the supply tank $V_1$ the propionic acid is compensated for in the reaction vessel $R_1$. The speed of circulation of the gas is chosen so that the gas is regenerated in the reaction vessel 80–100 times per hour. In the course of 116 hours 8260 parts of propionic acid are introduced. From the receiver $V_2$ 9968 parts of a mixture are removed which consists of 6810 parts of propionic acid, 2390 parts of 1.3-butadienol-2-propionate and 768 parts of dissolved monovinylacetylene. The operation is interrupted after 116 hours and the content of the column is examined. By cooling 167 parts of the compound mercury propionate+monovinylacetylene precipitate which are filtered with suction and used for a new batch. By distillation under reduced pressure a mixture of propionic acid and only 5% of ester is obtained. Higher-boiling by-products are not formed. Polymerizate is, likewise, not obtained. Metallic mercury is present only in traces. The residue, 268 grams, contains further an addition product from mercury propionate and monovinylacetylene. The compound $Hg(COC_2H_5)_2+xC_4H_4$ may be warmed in the dry state only with great care since it decomposes at higher temperatures while deflagrating.

The propionic acid may also be separated easily from the 1.3-butadienol-2-propionate by means of cold magnesium-chloride solution which dissolves the propionic acid and leaves the ester undissolved. From the solution the propionic acid may be obtained by treatment with organic solvents such as benzene whereupon it may again be caused to react with monovinylacetylene. This mode of working may also be applied for the reaction of other acids with monovinylacetylene.

(2) The addition of propionic acid to monovinylacetylene may also be performed discontinuously. In a flask provided with a stirrer 500 parts of propionic acid, 75 parts of mercury propionate and 2 parts of thiodiphenylamine are heated to 80° C. and at this temperature monovinylacetylene is introduced during 50 hours. The operation is interrupted when the absorption decreases. The contents of the flask are cooled sharply whereby part of the catalyst precipitates. The liquid is decanted and the dissolved monovinylacetylene is removed under pressure. There are obtained 643 parts which are distilled under reduced pressure. 466 parts thereof pass over between 35° C. and 42° C. under a pressure of 2 mm. Hg. This fraction contains 222 parts of 1.3-butadienol-2-propionate and 244 parts of propionic acid. 28 parts of the mixture of esters pass over between 42° C. and 83° C. under a pressure of 2 mm. Hg. 94 parts of the compound from 2 mols of propionic acid and 1 mol of monovinylacetylene follow between 99° C.–102° C. under a pressure of 2 mm. A remainder of 50 parts contains the residue of the mercury catalyst.

(3) In the cyclic apparatus shown in the accompanying drawing there are heated to 75° C. 1000 parts of acetic acid, 320 parts of mercury acetate and 4 parts of thiodiphenylamine. While passing monovinylacetylene therethrough, the color of the solution turns from green to violet. In the course of 50 hours 6460 parts of glacial acetic acid are introduced. During this time 8166 parts of a mixture are obtained which contains 1066 parts of 1.3-butadienol-2-acetate and 5880 parts of glacial acetic acid and about 1220 parts of dissolved monovinylacetylene.

(4) In a flask provided with a stirrer 1080 parts of glacial acetic acid are heated to 80° C. together with 150 parts of mercury-acetate and 6 parts of thiodiphenylamine. Monovinylacetylene is introduced during 55 hours. The operation is interrupted when the absorption of the gas decreases. The contents of the flask are cooled. Part of the catalyzer cristallizes. The liquid is decanted and the monovinylacetylene is filtered with suction under reduced pressure. 1615 parts are distilled under reduced pressure. The first fraction passes over between 22° C.–40° C. under a pressure of 2 mm. Hg. It amounts to 1122 parts and consists of 531 parts of 1.3-butadienol-2 acetate and 591 parts of acetic acid. The remainder in the flask amounts to 434 parts and contains the compound from 2 mols of acetic acid and 1 mol of monovinylacetylene, the residue of the mercury catalyst and a small quantity of polymerizate.

(5) 440 parts of isobutyric acid and 86 parts of isobutyrate of mercury are heated at 80° C. in a flask provided with a stirrer together with 2 parts of thiodiphenylamine. Monovinylacetylene is introduced for 32 hours. The operation is interrupted and the contents of the flask are cooled. Beautiful crystals of the mercury catalyst precipitate and are removed. 557 parts are distilled under reduced pressure. Between 43° C. and 60° C. 444 parts pass over at 5 mm. pressure Hg which consist of isobutyric acid and 1.3-butadienol-2-isobutyrate. Then follow between 90° C. and 104° C. under a pressure of 5 mm. Hg 11 parts of an ester of higher boiling point, presumably the compound from 2 mols of isobutyric acid and 1 mol of monovinylacetylene. The remainder amounts to 64 parts and contains an ester of higher boiling point and the residue of the mercury catalyst. The main fraction is introduced into ice water, neutralized by means of sodium carbonate, the oil is taken up in ether, dried over sodium sulfate and distilled under reduced pressure. Between 50° C. and 54° C. and under a pressure of 3–3.5 mm. Hg pure 1.3-butadienol - 2 - isobutyrate distils. The yield amounts to 213 parts.

(6) 378 parts of isoheptylic acid and 105 parts of isoheptylate of mercury are heated together with 2 parts of thiodiphenylamine to 70° C. in a flask provided with a stirrer. At this temperature monovinylacetylene is introduced in the course of 19 hours. The operation is interrupted and the mixture is allowed to cool. Part of the catalyzer separates in the form of a voluminous precipitate which is filtered with suction. 382 parts of liquid are distilled under reduced pressure. 320 parts pass between 90° C. and 109° C. under a pressure of 11–9 mm. The remaining 56 parts contain the residue of the mercury catalyzer. The fraction is introduced into water and neutralized by means of sodium carbonate while cooling with ice. The oil is separated, taken up in ether, dried over potassium carbonate and distilled after the ether has been driven off. Between 85° C. and 92° C. and under a pressure of 9 mm. Hg the 1.3-butadienol-2-isoheptylate distils. The yield amounts to 67 grams.

We claim:

1. The process of forming esters which comprises reacting vinylacetylene and an organic carboxylic acid in the presence of a stabilizing agent to prevent polymerization selected from the class consisting of thiodiphenylamine, methylene blue, and dibenzyl-β-naphthylamine and of a mercury salt of the organic carboxylic acid used and at temperatures between 60° C. and the boiling point of the liquid reaction mixture.

2. The process of forming esters which comprises reacting vinylacetylene and acetic acid in the presence of a stabilizing agent known to prevent polymerization and selected from the class consisting of thiodiphenylamine, methylene blue and dibenzyl-β-naphthylamine and of mercury acetate at temperatures between 60° C. and the boiling point of the liquid reaction mixture.

3. The process of forming esters which comprises reacting vinylacetylene and propionic acid in the presence of a stabilizing agent known to prevent polymerization and selected from the class consisting of thiodiphenylamine, methylene blue and dibenzyl-β-naphthylamine and of mercury propionate at temperatures between 60° C. and the boiling point of the liquid reaction mixture.

4. The process of forming esters which comprises reacting vinylacetylene and isobutyric acid in the presence of a stabilizing agent to prevent polymerization and selected from the class consisting of thiodiphenylamine, methylene blue and dibenzyl-β-naphthylamine and of mercury isobutyrate at temperatures between 60° C. and the boiling point of the liquid reaction mixture.

5. The process of producing esters which comprises heating viny acetyene and propionic acid in the presence of mercury propionate and thiodiphenylamine to a temperature of 80° C.

6. The process of forming esters which comprises heating vinylacetylene and acetic acid in the presence of mercury acetate and thiodiphenylamine to a temperature of 75° C.

7. The process of producing esters which comprises heating vinyl acetylene and isobutyric acid in the presence of mercury isobutyrate and thiodiphenylamine to a temperature of 80° C.

ARTHUR WOLFRAM.
HELLMUTH JAHN.